United States Patent
Tang et al.

(10) Patent No.: US 8,570,916 B1
(45) Date of Patent: Oct. 29, 2013

(54) JUST IN TIME DISTRIBUTED TRANSACTION CREDITING

(75) Inventors: Yin Fung Tang, Mountain View, CA (US); Dane Mrazek, Redwood City, CA (US)

(73) Assignee: Nvidia Corporation, Santa Clara, CA (US)

( * ) Notice: Subject to any disclaimer, the term of this patent is extended or adjusted under 35 U.S.C. 154(b) by 312 days.

(21) Appl. No.: 12/791,771

(22) Filed: Jun. 1, 2010

Related U.S. Application Data

(60) Provisional application No. 61/245,153, filed on Sep. 23, 2009.

(51) Int. Cl.
    *H04B 1/44* (2006.01)
(52) U.S. Cl.
    USPC .......................................... 370/282
(58) Field of Classification Search
    USPC ............ 370/282, 431, 231, 235.1, 236, 236.1
    See application file for complete search history.

(56) References Cited

U.S. PATENT DOCUMENTS

| | | | |
|---|---|---|---|
| 6,469,982 B1 * | 10/2002 | Henrion et al. | 370/230 |
| 6,683,884 B1 * | 1/2004 | Howard | 370/412 |
| 7,330,477 B2 * | 2/2008 | Hendel et al. | 370/412 |
| 7,373,420 B1 * | 5/2008 | Lyon | 709/235 |
| 7,480,730 B2 * | 1/2009 | Stuart et al. | 709/232 |
| 2004/0004971 A1 * | 1/2004 | Wang | 370/412 |
| 2004/0027989 A1 * | 2/2004 | Martin et al. | 370/229 |
| 2005/0228900 A1 * | 10/2005 | Stuart et al. | 709/234 |
| 2006/0050639 A1 * | 3/2006 | Stuart et al. | 370/235 |
| 2010/0208587 A1 * | 8/2010 | Landry et al. | 370/230.1 |

* cited by examiner

*Primary Examiner* — Mark Rinehart
*Assistant Examiner* — Kenneth P Hunt
(74) *Attorney, Agent, or Firm* — Patterson & Sheridan, L.L.P.

(57) ABSTRACT

One embodiment of the present invention sets forth a destination credit management unit (CMU) that is coupled to source clients and a destination client and manages the transmission of credits associated with the destination client to the source clients. The destination CMU receives credits from the destination client as memory spaces within the destination client free up and transmits the credits to source clients as credits are consumed by the source clients. When a data packet is received from a source client, the destination CMU returns a credit to the source client if a credit is available. If a credit is not available, then the destination CMU stalls the source client until a credit becomes available. Credits are transmitted to stalled source clients in the order in which the source clients were stalled.

22 Claims, 8 Drawing Sheets

JUST IN TIME DISTRIBUTED TRANSACTION CREDITING

CROSS-REFERENCE TO RELATED APPLICATIONS

This application claims benefit of U.S. provisional patent application Ser. No. 61/245,153, filed on Sep. 23, 2009, entitled "JUST IN TIME DISTRIBUTED TRANSACTION CREDITING."

BACKGROUND OF THE INVENTION

1. Field of the Invention

The present invention relates generally to the field of data transmission and, more specifically, to just in time distributed transaction crediting.

2. Description of the Related Art

A graphics processing unit (GPU) is a specialized processor that is configured to efficiently process complex graphics and other numerical computations. Each GPU has several on-chip hardware components, such as memory caches and logic operations units, configured to efficiently perform the graphics and numerical computations.

In a typical GPU, multiple source hardware components transmit data packets to a destination hardware component for further processing. For example, multiple processing cores may transmit data packets to a memory management unit for storage in a memory unit. A destination hardware component typically includes buffer memories for storing data packets received from source hardware components until the data packets can be processed. To avoid buffer overflow scenarios, GPU hardware architectures often implement a crediting mechanism, where a credit corresponds to a unit of memory space within a buffer memory of the destination hardware component. With such a mechanism, the destination hardware component transmits credits to each of the source hardware components, and a source hardware component can only transmit data packet to a destination hardware component if a credit is available.

One drawback to a hardware architecture implementing such a crediting mechanism is that, to allow for data packet streaming, the required size of a buffer memory is very large. Specifically, the required size of the buffer memory is the sum of the roundtrip transmission times between each of the source hardware components and the destination hardware component. The buffer memory within the destination hardware component, therefore, consumes a large die area on the GPU chip which is both undesirable and expensive to produce.

As the foregoing illustrates, what is needed in the art is a credit management mechanism that allows for a reduced size of a buffer memory within a destination client.

SUMMARY OF THE INVENTION

One embodiment of the present invention sets forth a method for distributing credits associated with a destination client to one or more source clients to manage data packet transmissions between the one or more source clients and the destination client. The method comprising the steps of receiving a first data packet from a first source client for transmission to the destination client, where the first source client is associated with an initial number of credits needed to transmit data packets, determining whether at least one credit associated with the destination client and stored in a shared credit pool is available for transmission to the first source client, wherein each credit associated with the destination client corresponds to a unit of memory space in which a data packet may be stored within the destination client, transmitting a first credit from the shared credit pool to the first source client when at least one credit is available for transmission to the first source client, wherein the first source client can transmit another data packet once the first credit is received, or stalling the first source client when no credit is available for transmission to the first source client, and transmitting the first data packet to the destination client for storage in a first unit of memory space within the destination client.

One advantage of the techniques described herein is that the required size of the storage buffer within the destination client is reduced because credits are distributed by the destination credit management unit (CMU) and not the destination client to the different source clients. The credits are saved as a result of placing the CMU closer to the source clients than the destination client, thus reducing the transmission cycles needed to transmit credits to the source clients.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
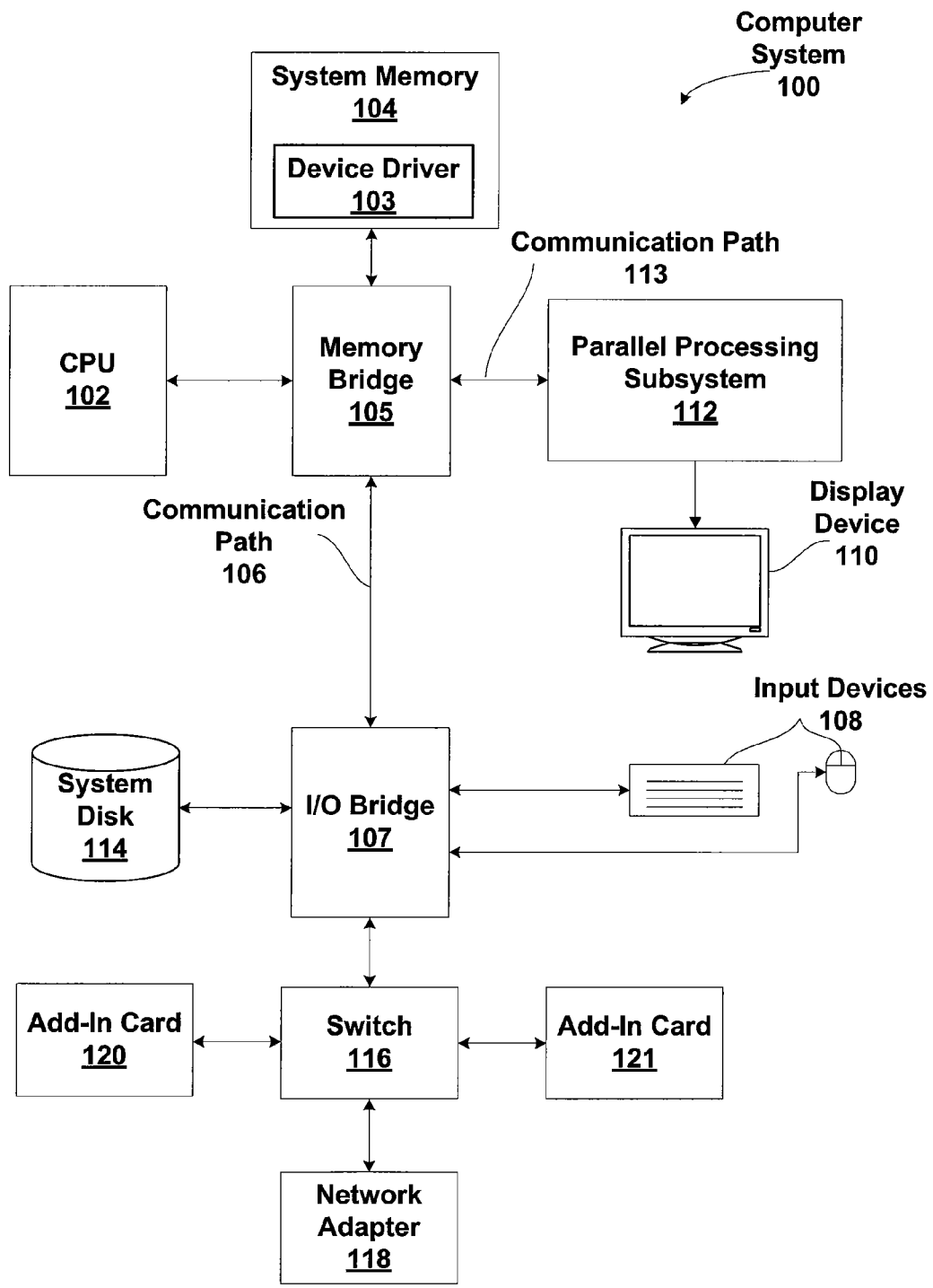
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
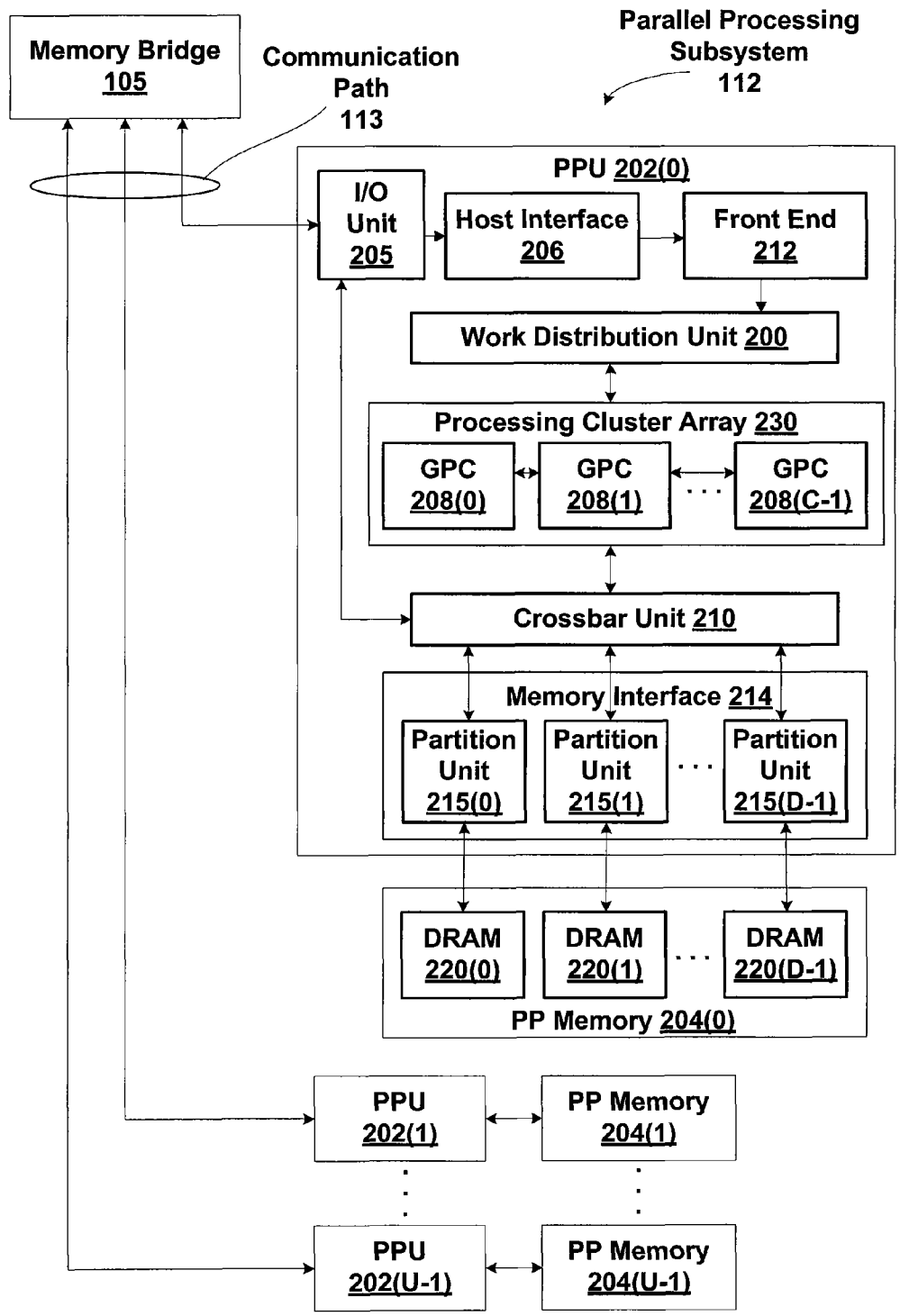
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
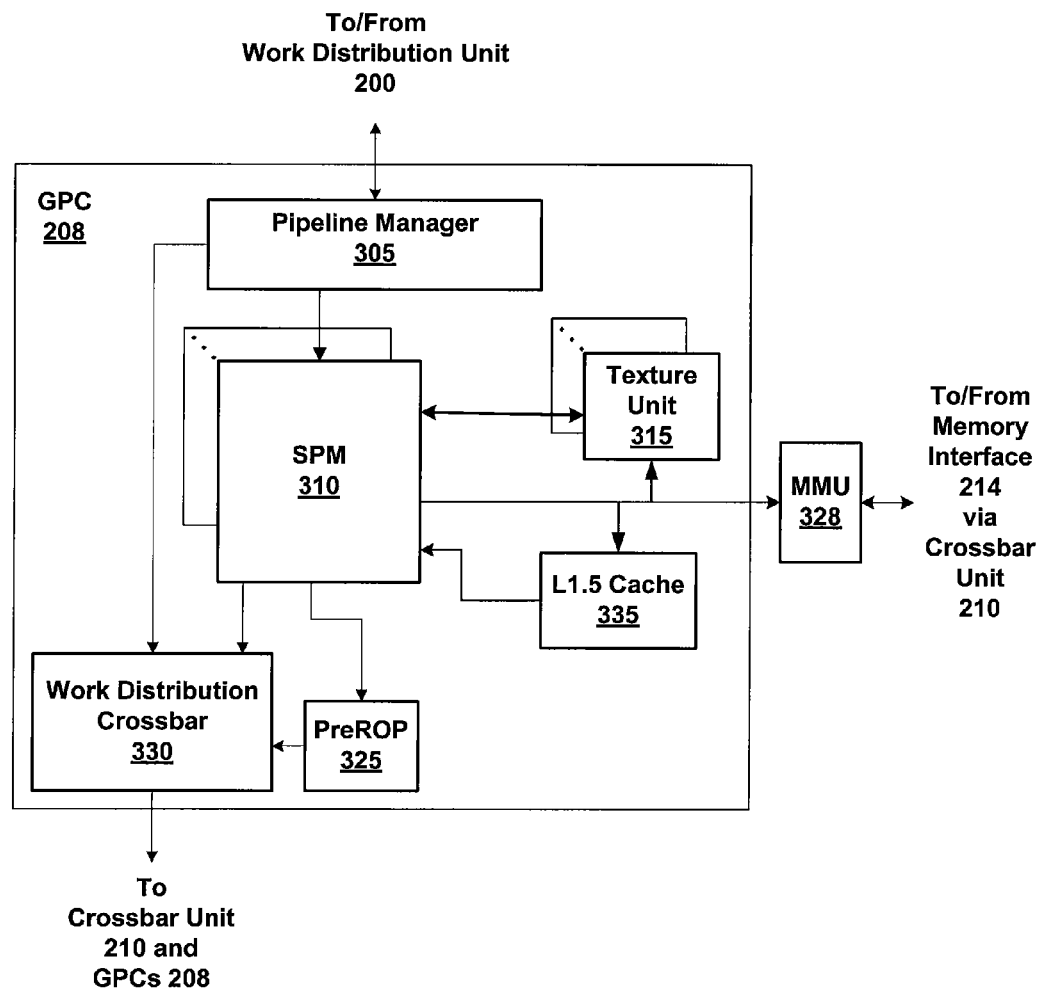
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
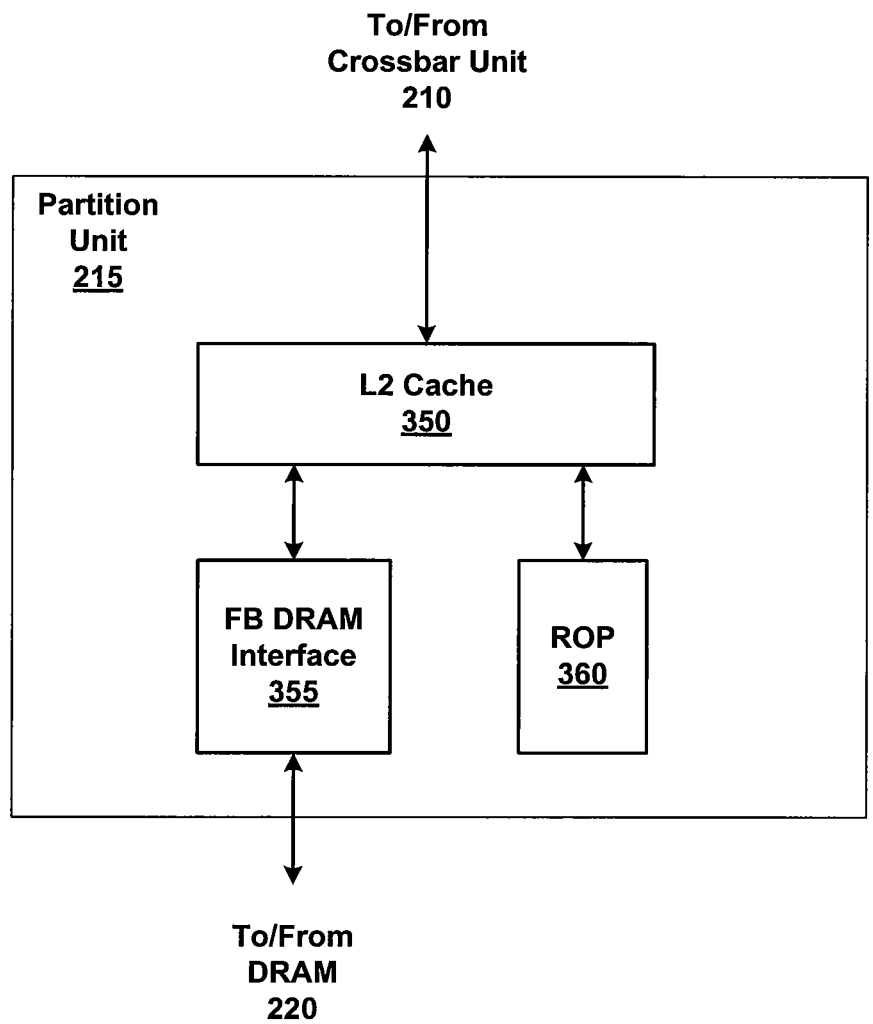
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
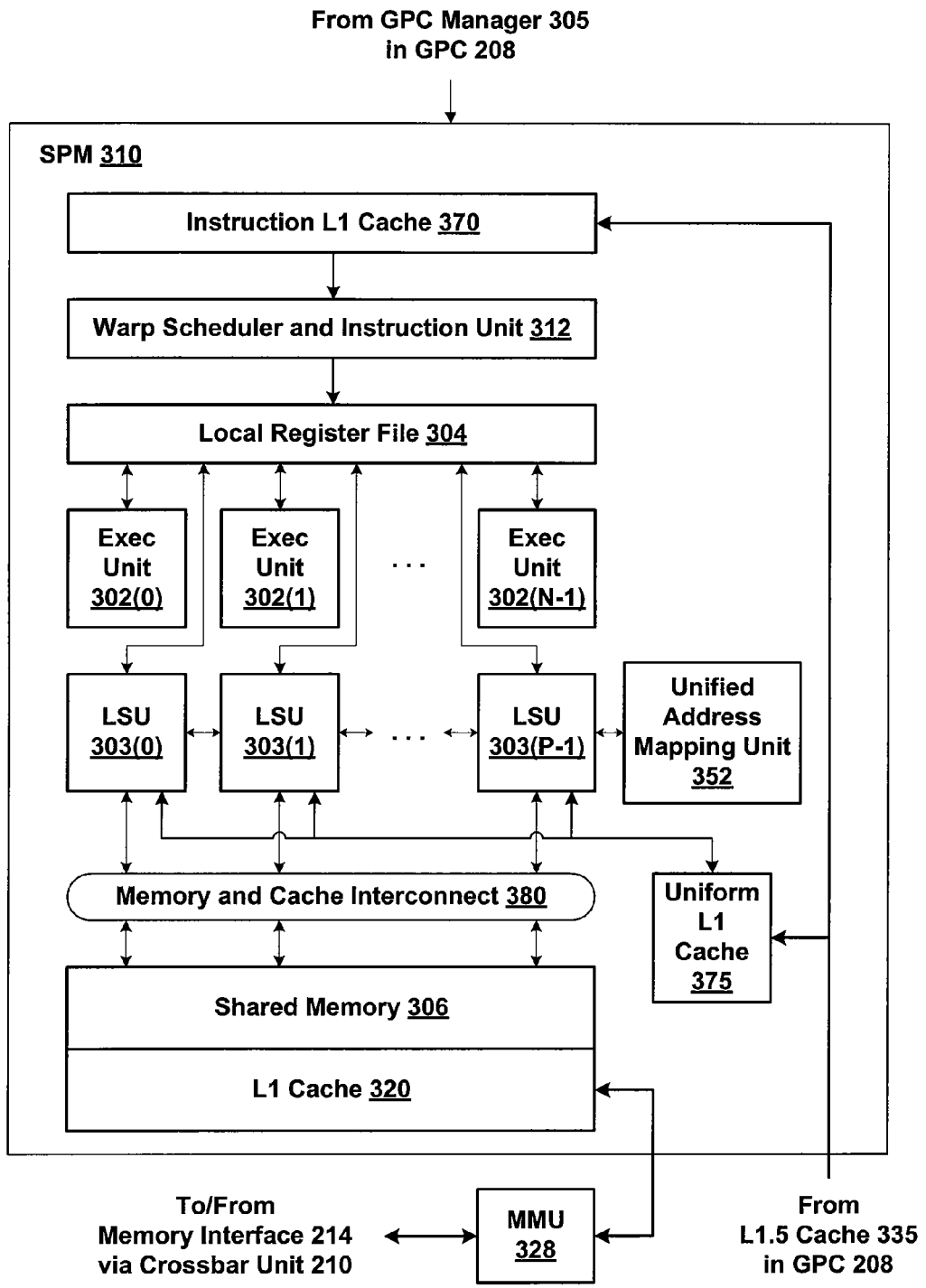
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CIA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Just in Time Credit Management

Figure 4:
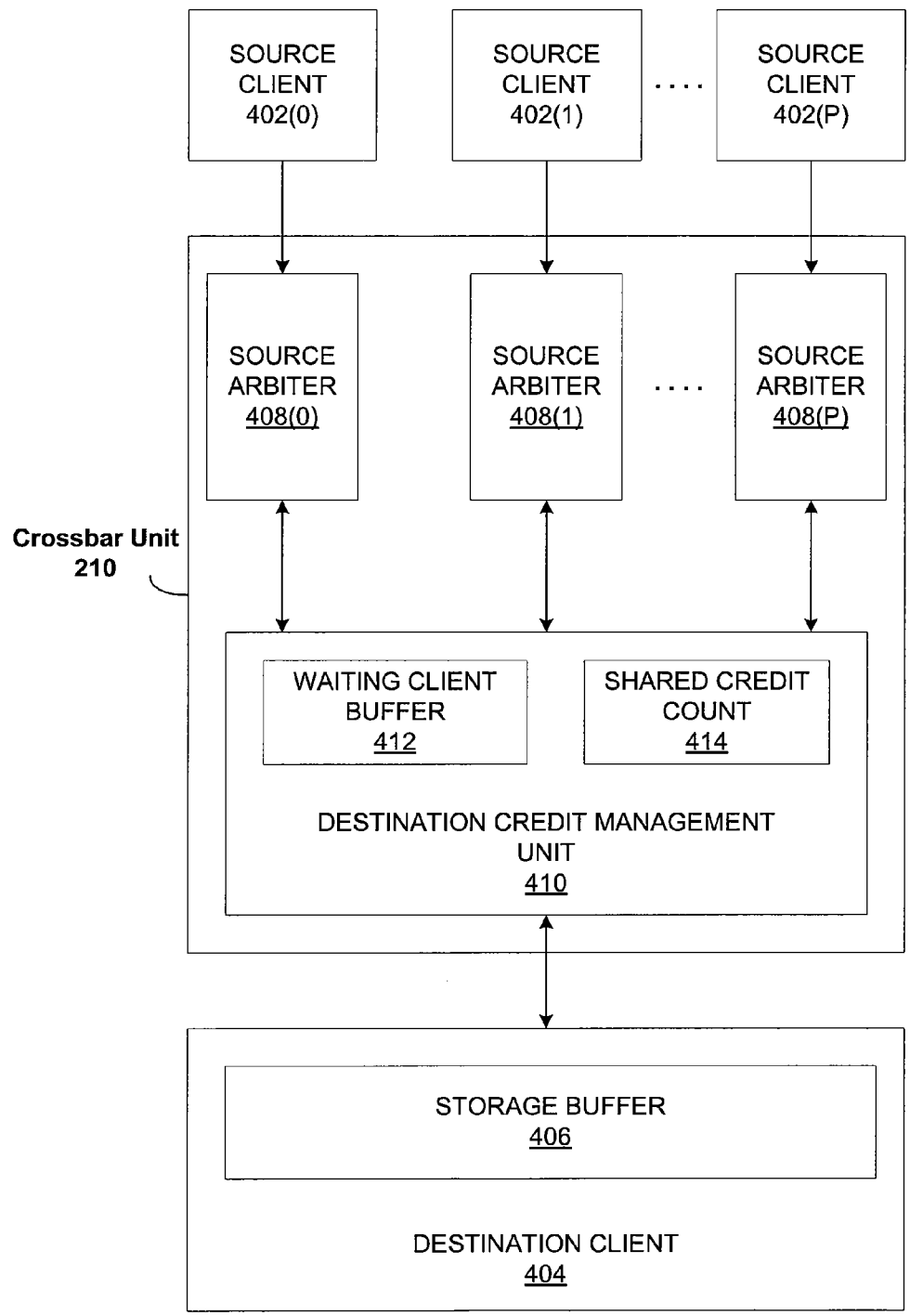
FIG. 4 illustrates a destination credit management unit (CMU) within the crossbar unit of FIG. 2 for distributing credits to source clients, according to one embodiment of the present invention.

FIG. 4 illustrates a destination credit management unit (CMU) 410 within the crossbar unit 210 of FIG. 2 for distributing transmission credits to source clients 402, according to one embodiment of the present invention. As shown, the crossbar unit 210 includes source arbiters 408, where each source arbiter 408 corresponds to a different source client 402, and the destination CMU 410 that corresponds to the destination client 404. Importantly, the destination CMU 410 credits is placed close to the source client 402. Placing the destination CMU 410 close to the source clients 402 reduces the transmission cycles needed to transmit credits to the source clients.

A source client 402 may be any component, such as a GPC 208, within the parallel processing unit 202 described herein. Similarly, the destination client 404 may be any component, such as a partition unit 215, within the parallel processing unit 202 described herein. In operation, the source clients 402 transmit packets of data to the destination client 404 via the crossbar 210. To ensure that, at any given clock cycle, a storage buffer 406 within the destination client 404 has memory space available for storing a data packet received from a source client 402, a crediting mechanism is implemented. A credit corresponds to a unit of memory space in which a data packet may be stored within the storage buffer 406. The number of credits associated with the storage buffer 406 (referred to herein as "the total number of credits") is based on the sum of round-trip transmission time between each of the source arbiters 408 and the destination CMU 410 and the round-trip transmission time between the destination CMU 410 and the destination client 404. Importantly, the source client 402 can only transmit a data packet to the destination client 404 if a credit is available to the source client 402.

When the parallel processing unit 202 is initialized, each source client 402 is allocated a specific number of credits from the total number of credits for transmitting data packets to the destination client 404 in a streaming fashion. Each source arbiter 408 manages the credits allocated to the corresponding source client 402. In one embodiment, the number of credits allocated to a source client 402 may be based on properties associated with the source clients 402 or the types of data packets being transmitted by the source clients 402. In another embodiment, the number of credits allocated to a source client 402 may be programmatically determined. In addition to allocating credits to the source clients 402, a specific number of credits are also allocated to the destination CMU 410. The credits allocated to the destination CMU 410 are stored in a shared credit pool 414 and are distributed to the source arbiters 408 based on the mechanisms described below.

For the purposes of discussion only, the following description traces the path of a data packet transmitted from the source client 402(0) to the destination client 404. The source client 402(0) transmits the data packet to the source arbiter 408(0) within the crossbar unit 210. The source arbiter 408(0) determines whether a credit is available for transmitting the data packet to the destination client 404. Again, a credit corresponds to a unit of memory space in which a data packet may be stored within the storage buffer 406 and each source client 402 is allocated a specific number of credits for transmitting data packets.

If a credit is not available, then the source arbiter 408(0) buffers the data packet until the data packet can be transmitted. If, however, a credit is available, then the source arbiter 408(0) transmits the data packet to the destination CMU 410, thereby consuming the available credit. In response to receiving the data packet, the destination CMU 410 performs two operations. First, the destination CMU 410 transmits the data packet to the storage buffer 406 within the destination client 404 for storage. Second, the destination CMU 410 determines whether a credit is available within the shared credit pool 414 that can be returned to the source arbiter 408(0).

To determine whether a credit that can be returned to the source arbiter 408(0) is available within the shared credit pool 414, the destination CMU 410 first determines whether the count of the credits in the shared credit pool 414 is less than or equal to zero. If the count is less than or equal to zero, then no credit is available for transmission to the source arbiter 408 (0), and the destination CMU 410 adds a source client identifier associated with the source client 402(0) to the waiting client buffer 412. The waiting client buffer 412 is a first-in-first-out buffer that stores source client identifiers associated with different source clients in the order in which the identifiers were added to the waiting client buffer 412. A source client 402 that does not have any further credits for transmitting data packets to the destination client 404 and to which the destination CMU 410 does not return a credit upon receipt of a data packet is waiting to receive transmission credits and is, hence, referred to herein as "a waiting source client."

If, however, the count of the credits in the shared credit pool 414 is greater than zero, then the destination CMU 410 determines whether any source clients 402 are waiting to receive credits based on the source client identifiers stored in the waiting client buffer 412. If no source clients 402 are waiting to receive credits, then a credit from the shared credit pool 414 is transmitted to the source arbiter 408(0). If, however, source clients 402 are waiting to receive credits, then any available credits in the shared credit pool 414 are first transmitted to the source arbiters 408 associated with the waiting source clients 402, and if any remain, then a remaining credit is transmitted to the source arbiter 408(0). In one embodiment, the destination CMU 410 transmits a credit available within the shared credit pool 414 at each clock cycle to a source client 402 in the order in which the source clients 402 consumed credits, i.e., the order in which source client identifiers associated with source clients 402 are stored within the waiting clients buffer 412.

In alternative embodiments, different mechanisms (other than the waiting client buffer) are used to record the source client identifiers of the waiting source clients. All such embodiments are contemplated by this invention.

The destination CMU 410 also receives credits from the destination client 404 when a data packet stored within the storage buffer 406 is evicted, thereby freeing up a memory space within the storage buffer 406. A credit received from the destination client 404 increases the count of the credits stored in the shared credit pool 414. In such a manner, available credits received from the destination client 404 can be distributed back to the source clients 402 for consumption.

Figure 5:
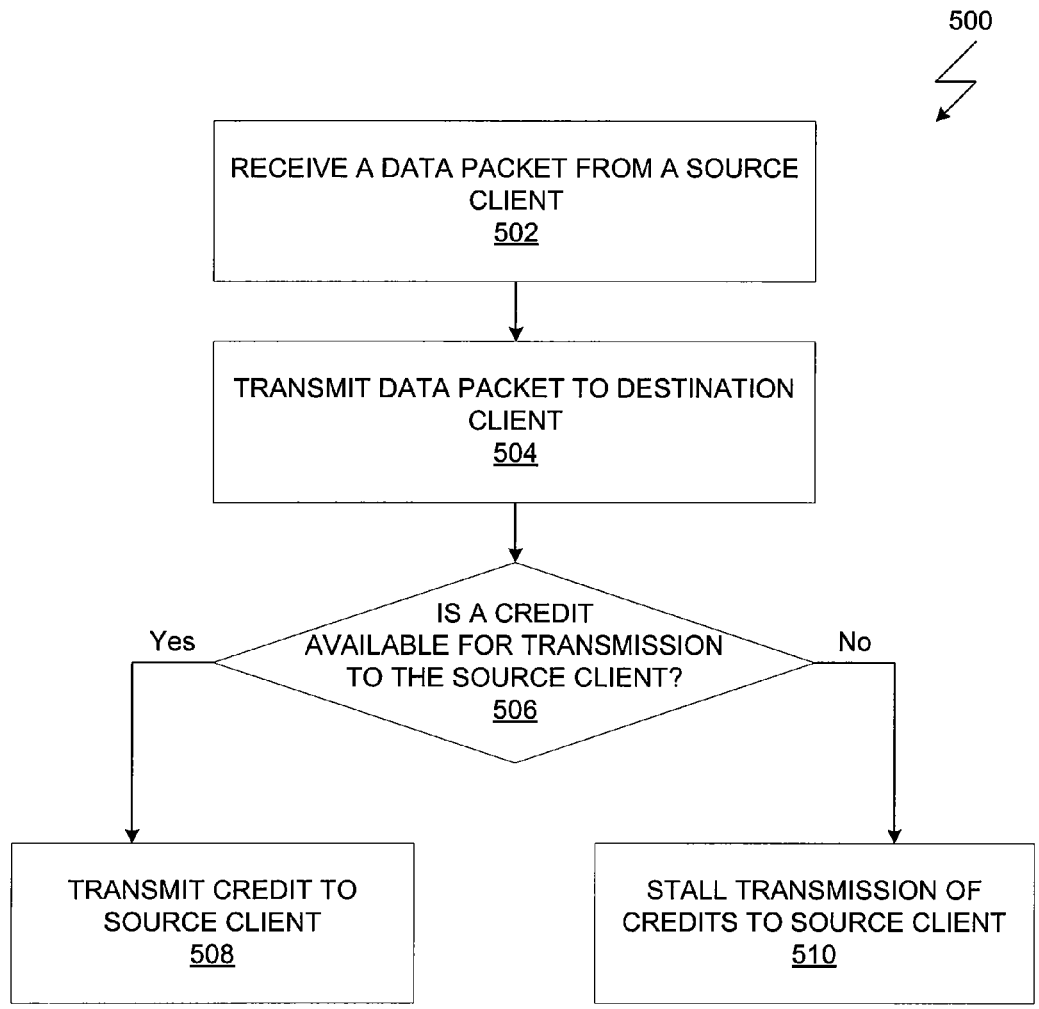
FIG. 5 is a flow diagram of method steps for distributing credits associated with a destination client to source clients to manage data distribution between the destination client and the source clients, according to one embodiment of the present invention.

FIG. 5 is a flow diagram of method steps for distributing credits associated with a destination client to source clients to manage data distribution between the destination client and the source clients, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the destination CMU 410 receives a data packet from a source client 402, such as source client 402(0), via a corresponding source arbiter 408. As previously described herein, the source client 402 transmits data packets to the destination client 404 via the source arbiter 408 and the destination CMU 410. Each time a data packet is transmitted to the destination CMU 410, a credit within the source arbiter 408 is consumed.

At step 504, the destination CMU 410 transmits the data packet received from the source client 402 to the destination client 404. At step 506, the destination CMU 410 determines whether a credit is available for transmission to the source client 402 from the shared credit pool 414. The mechanism implemented by the destination CMU 410 to determine credit availability is described in greater detail below with respect to FIG. 6.

If a credit is available for transmission to the source client 402, then, at step 508, the destination CMU 410 transmits the credit to the source client 402. If, however, a credit is not available for transmission to the source client 402, then, at step 510, the transmission of credits to the source client 402 are stalled and a source identifier associated with the source client 402 is added to the waiting client buffer 412. The waiting client buffer 412 stores source client identifiers associated with source clients 402 in the order in which the source clients 402 consumed credits. At each clock cycle, as credits become available (i.e., as credits are received from the destination client 404), the credits are transmitted to waiting source clients 402 in the order in which those source clients 402 consumed credits.

Figure 6:
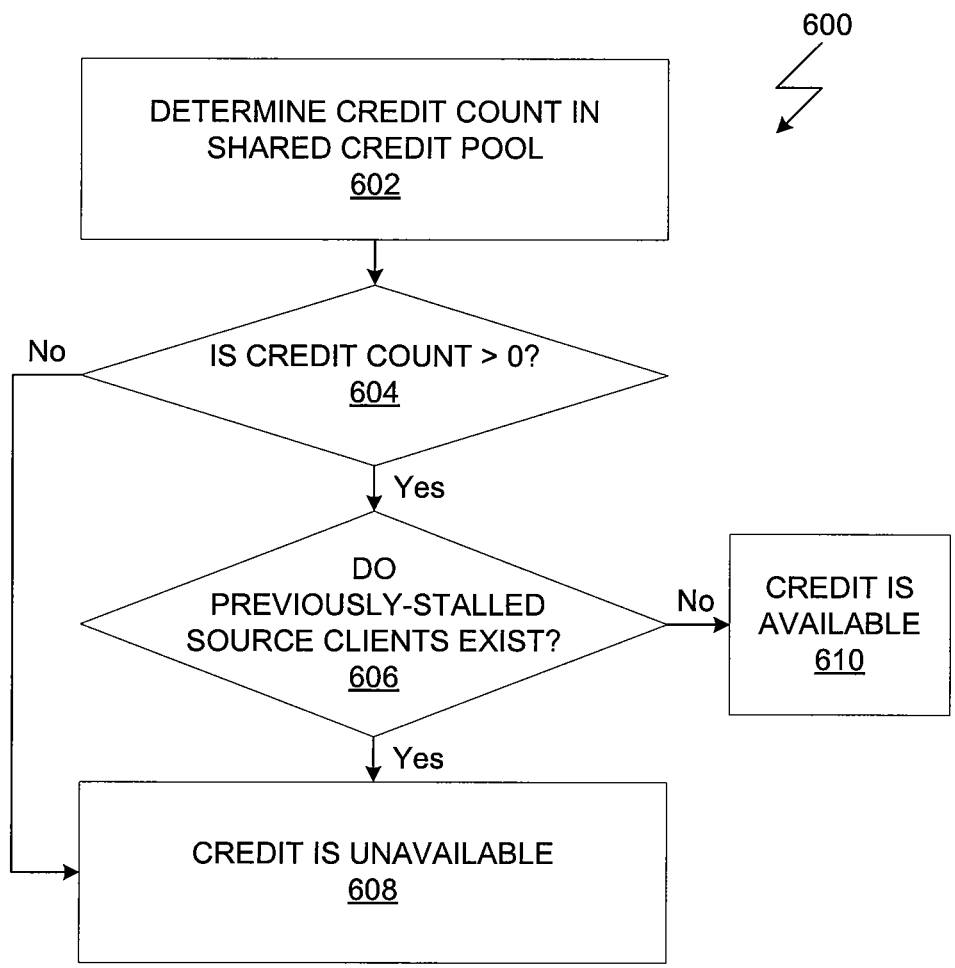
FIG. 6 is a flow diagram of method steps for determining whether a credit is available to transmit to a source client, according to one embodiment of the present invention.

FIG. 6 is a flow diagram of method steps for determining whether a credit is available to transmit to a source client, according to one embodiment of the present invention. Although the method steps are described in conjunction with the systems for FIGS. 1-4, persons skilled in the art will understand that any system configured to perform the method steps, in any order, is within the scope of the invention.

At step 602, the destination CMU 410 determines the count of the credits stored in the shared credit pool 414, and at step 604, the destination CMU 410 determines whether the count is greater than zero. If the count is greater than zero, then, at step 606, the destination CMU 410 determines whether source clients 402 waiting to receive credits exist. As previously described herein, the waiting source clients 402 are given priority when transmitting credits, and therefore, if waiting source clients 402 exist, then the transmitting source client 402 is also added to the waiting client buffer 412. Thus, at step 608, the destination CMU 410 determines that a credit is not available for transmission to the source client 402.

If, however, waiting source clients 402 do not exist, then, at step 610, the destination CMU 410 determines that a credit is available for transmission to the source client 402.

In an alternate embodiment, a source client 402(N) may be given priority over other source clients 402, and a credit from the shared credit pool 414 may be transmitted to the source client 402(N) even if other source clients 402 are waiting to receive credits.

In another alternate embodiment, the transmitting source client 402 is entered into the waiting client buffer 412 when a data packet is received from the source client 402. At each clock cycle, a source client in the waiting client buffer 412 is selected for receiving an available credit.

One advantage of the disclosed technique is that the required size of the storage buffer within the destination client is reduced because credits are distributed by the destination CMU and not the destination client to the different source clients. Importantly, the size of the storage buffer is based on the sum of round-trip transmission time between each of the source arbiters and the destination CMU and the round-trip transmission time between the destination CMU and the destination client 404. Reducing the size of buffer memory advantageously saves die area on the GPU chip.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for distributing credits associated with a destination client to one or more source clients to manage data packet transmissions between the one or more source clients and the destination client, the method comprising:
receiving, at a crossbar unit, a first data packet from a first source client for transmission to the destination client, wherein the first source client is associated with a first source arbiter that includes an first quantity of credits needed to transmit data packets;
determining whether at least one credit in the first quantity of credits is available;

if at least one credit in the first quantity of credits is not available, then storing the first data packet in a local memory; or if at least one credit in the first quantity of credits is available, then:
consuming one credit from the first quantity of credits,
transmitting the first data packet from the destination credit management unit to the destination client for storage in a first unit of memory space within the destination client,
determining whether at least one credit stored in a second quantity of credits is available for transmission to the first source arbiter, wherein the second quantity of credits comprises a shared credit pool in the destination credit management unit that is shared among the one or more source clients, and
if at least one credit in a second quantity of credits is not available, then:
not transmitting any credits to the first source arbiter when a credit is unavailable for transmission to the first source arbiter; and
adding an identifier associated with the first source client to a waiting client buffer, or,
if at least one credit in a second quantity of credits is available, then transmitting a credit from the second quantity of credits to the first source arbiter for storage in the first quantity of credits.

2. The method of claim 1, further comprising the step of receiving a second credit from the destination client for storage within the second quantity of credits after the first data packet is evicted from the first unit of memory space.

3. The method of claim 1, wherein the step of determining whether at least one credit stored in the second quantity of credits is available for transmission to the first source arbiter comprises determining whether a count of credits stored in the second quantity of credits is greater than zero.

4. The method of claim 3, wherein no credit is available for transmission to the first source arbiter when the count of credits in the second quantity of credits is equal to or less than zero.

5. The method of claim 3, wherein no credit is available for transmission to the first source arbiter when the count of credits in the second quantity of credits is equal to or less than the number of previously waiting source clients.

6. The method of claim 3, wherein at least one credit is available for transmission to the first source arbiter when the count of credits in the second quantity of credits is both greater than zero and greater than the number of previously waiting source clients.

7. The method of claim 3, wherein at least one credit is available for transmission to the first source arbiter when the count of credits in the second quantity of credits is greater than zero, and the first source client has a higher priority than any previously waiting source client.

8. The method of claim 1, wherein the step of not transmitting any credits to the first source arbiter when a credit is unavailable for transmission to the first source arbiter comprises storing a first source identifier associated with the first source client in a credit usage buffer.

9. The method of claim 8, wherein the credit usage buffer stores source identifiers associated with different waiting source clients in the order in which the one or more source clients consume credits.

10. The method of claim 8, further comprising the step of:
transmitting the second credit to the first source arbiter when the first source client was waiting longer than any other one or more source clients; and
removing the first source identifier stored in the credit usage buffer.

11. The method of claim 1, further comprising the step of simultaneously transmitting a different credit to each of a plurality of source arbiters waiting to receive credits when the different credits are available.

12. A computer system, comprising:
one or more source clients;
a destination client;
and a crossbar unit, including one or more source arbiters, coupled to the one or more source clients and the destination client and configured to perform the steps of:
receiving, at a crossbar unit, a first data packet from a first source client for transmission to the destination client, wherein the first source client is associated with a first source arbiter that includes an first quantity of credits needed to transmit data packets;
determining whether at least one credit in the first quantity of credits is available;
if at least one credit in the first quantity of credits is not available, then storing the first data packet in a local memory; or
if at least one credit in the first quantity of credits is available, then:
consuming one credit from the first quantity of credits,
transmitting the first data packet from the destination credit management unit to the destination client for storage in a first unit of memory space within the destination client,
determining whether at least one credit stored in a second quantity of credits is available for transmission to the first source arbiter, wherein the second quantity of credits comprises a shared credit pool in the destination credit management unit that is shared among the one or more source clients, and
if at least one credit in a second quantity of credits is not available, then:
not transmitting any credits to the first source arbiter when a credit is unavailable for transmission to the first source arbiter; and
adding an identifier associated with the first source client to a waiting client buffer, or,
if at least one credit in a second quantity of credits is available, then transmitting a credit from the second quantity of credits to the first source arbiter for storage in the first quantity of credits.

13. The computer system of claim 12, further comprising the step of receiving a second credit from the destination client for storage within the second quantity of credits after the first data packet is evicted from the first unit of memory space.

14. The computer system of claim 12, wherein the step of determining whether at least one credit stored in the second quantity of credits is available for transmission to the first source arbiter comprises determining whether a count of credits stored in the second quantity of credits is greater than zero.

15. The computer system of claim 14, wherein no credit is available for transmission to the first source arbiter when the count of credits in the second quantity of credits is equal to or less than zero.

16. The computer system of claim 14, wherein no credit is available for transmission to the first source arbiter when the count of credits in the second quantity of credits is equal to or less than the number of previously waiting source clients.

17. The computer system of claim 14, wherein at least one credit is available for transmission to the first source arbiter when the count of credits in the second quantity of credits is both greater than and zero greater than the number of previously waiting source clients.

18. The computer system of claim 14, wherein at least one credit is available for transmission to the first source arbiter when the count of credits in the second quantity of credits is greater than zero, and the first source client has a higher priority than any previously waiting source client.

19. The computer system of claim 12, wherein the step of not transmitting any credits to the first source arbiter when a credit is unavailable for transmission to the first source arbiter comprises storing a first source identifier associated with the first source client in a credit usage buffer.

20. The computer system of claim 19, wherein the credit usage buffer stores source identifiers associated with different waiting source clients in the order in which the one or more source clients consume credits.

21. The computer system of claim 19, further configured to:
 transmit the second credit to the first source arbiter when the first source client was waiting longer than any other one or more source clients; and
 remove the first source identifier stored in the credit usage buffer.

22. The method of claim 1, further comprising the step of storing credits allocated to the destination credit management unit within the second quantity of credits.

* * * * *